(12) United States Patent
Lipscomb

(10) Patent No.: US 9,101,114 B2
(45) Date of Patent: Aug. 11, 2015

(54) ANIMAL ATTRACTANT DISPENSING DEVICE

(75) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 246 days.

(21) Appl. No.: 13/990,469

(22) PCT Filed: Dec. 1, 2011

(86) PCT No.: PCT/US2011/062972
§ 371 (c)(1),
(2), (4) Date: Jul. 18, 2013

(87) PCT Pub. No.: WO2012/075346
PCT Pub. Date: Jun. 7, 2012

(65) Prior Publication Data
US 2013/0291804 A1    Nov. 7, 2013

Related U.S. Application Data

(60) Provisional application No. 61/418,816, filed on Dec. 1, 2010, provisional application No. 61/526,707, filed on Aug. 24, 2011.

(51) Int. Cl.
*A01K 15/02* (2006.01)
*A01K 11/00* (2006.01)

(52) U.S. Cl.
CPC ............. *A01K 15/025* (2013.01); *A01K 15/024* (2013.01); *A01K 15/026* (2013.01)

(58) Field of Classification Search
CPC . A01K 15/024; A01K 15/025; A01K 15/026; A63F 9/0601
USPC ............................................. 119/711
See application file for complete search history.

(56) References Cited

U.S. PATENT DOCUMENTS

| | | | | |
|---|---|---|---|---|
| 4,133,296 A * | 1/1979 | Smith | ............................ | 119/709 |
| 4,928,632 A * | 5/1990 | Gordon | ........................... | 119/709 |
| 5,653,196 A * | 8/1997 | Bartleson | ....................... | 119/711 |
| 5,682,838 A * | 11/1997 | Reich | .............................. | 119/711 |
| 6,899,059 B1 | 5/2005 | Crane et al. | | |
| 2002/0187718 A1 | 12/2002 | Ritchey | | |
| 2003/0213440 A1* | 11/2003 | Kelly | .............................. | 119/708 |
| 2004/0139927 A1* | 7/2004 | Homan et al. | ................ | 119/711 |
| 2004/0216680 A1* | 11/2004 | Lamstein | ...................... | 119/28.5 |
| 2006/0054106 A1 | 3/2006 | Renforth | | |

(Continued)

*Primary Examiner* — Monica Williams
(74) *Attorney, Agent, or Firm* — Boyle Frederickson S.C.

(57) ABSTRACT

A dispensing animal interactive device formed of a perforate flexible pouch holding an animal attractant dispensed through perforations in the pouch during animal-induced deformation of the pouch during animal interaction. The pouch is formed of an endless sidewall of a biaxial woven or braided construction whose perforations change in size responsive to animal interaction. One preferred pouch holds catnip that is dispensed through perforations by engagement between the pouch sidewall and catnip from cat interaction that abrades catnip into smaller particles and that squeezes catnip out perforations in the sidewall with cat interaction causing the size of perforations in a region of the sidewall adjacent cat-induced deformation to increase dispensing catnip out of enlarged perforations. Ground catnip can express oils that can be dispensed in the form of a scent from the pouch and which increases the pungency of dispensed catnip.

24 Claims, 4 Drawing Sheets

(56) References Cited

U.S. PATENT DOCUMENTS

| | | |
|---|---|---|
| 2008/0149041 A1 | 6/2008 | Lamstein et al. |
| 2008/0196676 A1* | 8/2008 | Kim et al. ..................... 119/707 |
| 2009/0084325 A1* | 4/2009 | Moskoff ....................... 119/707 |

* cited by examiner

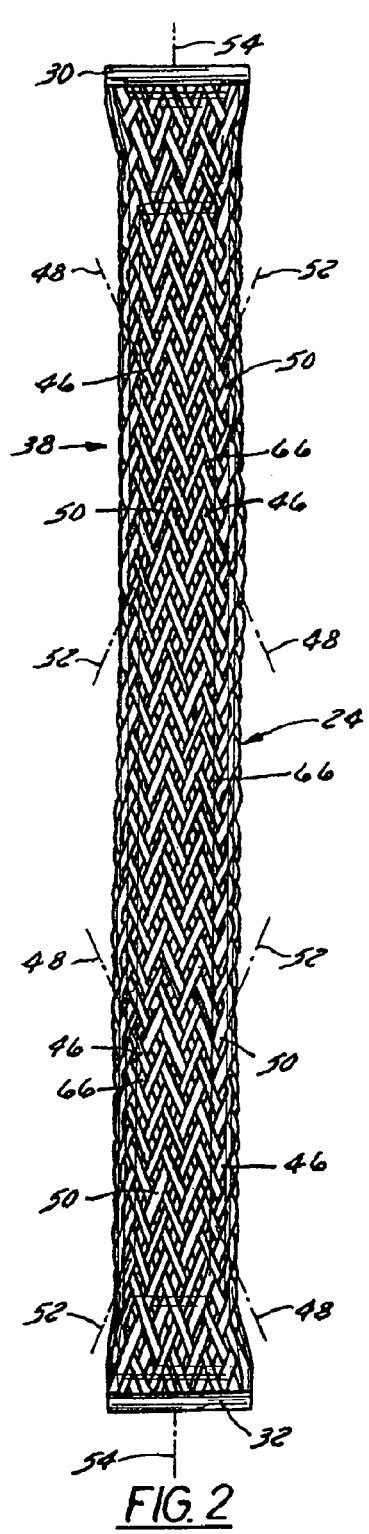
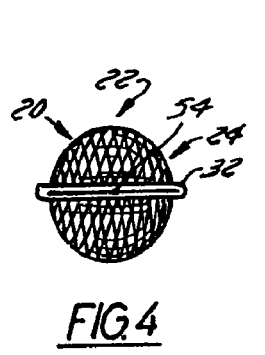
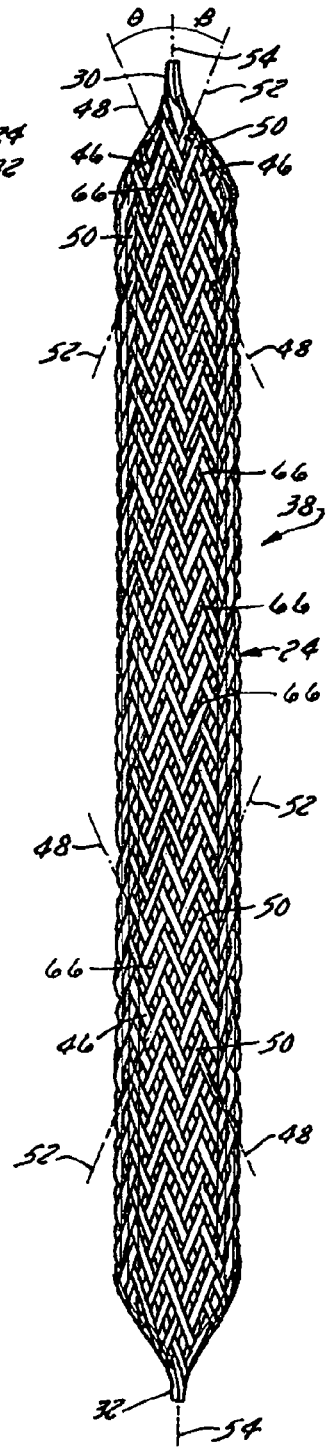

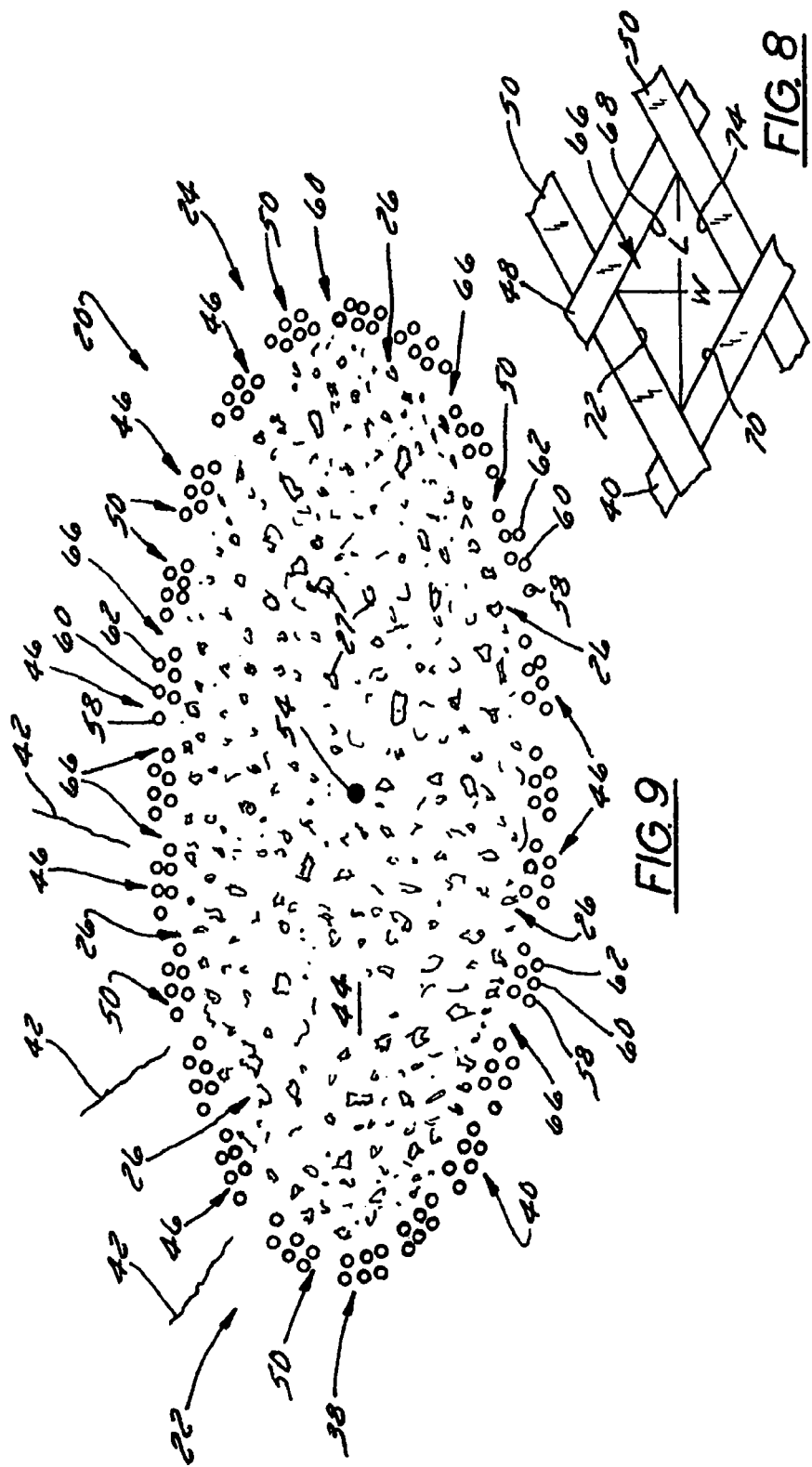

ANIMAL ATTRACTANT DISPENSING DEVICE

FIELD

The present invention relates generally to a device with which an animal interacts that dispenses material during interaction and more particularly to a dispensing animal interactive device used for play, training and the like that can be an animal toy.

BACKGROUND

There are many pet toys and animal training devices that have been used in the past to entice interaction with the device including for play training and the like. In the past, most, if not all, of these devices are heavy, bulky, breakdown, or require maintenance and/or refilling, which has led to limited commercial acceptance.

Toys for use by domestic animals are well known in the art. Such toys may be intended purely for the entertainment purpose of the animal, or they may include secondary functions, such as providing a means of exercise, promoting oral health, or providing a scratching outlet. These pet toys are often round or curved in shape to promote mobility of the toy, and in turn allowing the pet to move and chase after the toy during play. This movement provides an opportunity for exercise that is particularly important in domestic animals that are confined to living indoors.

Other toys promote interaction between the toy and the pet by utilizing a pet attractant in combination with the toy. Such attractants may include a piece of food lodged within the center of the toy, a scent imparted onto the toy, an outer surface of stimulating bright colors, or even constructing the toy out of a consumable material. All of these additional pet attractants offer additional means for stimulating the pet during play, and thereby increase the degree of both entertainment and beneficial exercise of the pet.

In toys intended for use by domestic cats, their use as a scratching device is also important. Providing a scratching outlet is particularly useful for cats who have not been declawed, and who may otherwise cause unwanted damage to home furnishings. Accordingly, such toys must provide an exterior surface that promotes scratching, while also withstanding the force of scratching. Similarly, those toys designed to be bitten or chewed must be made of a material of significant strength, capable of withstanding the forces applied to it.

As previously indicated, some toys may also release a treat for the animal. Catnip is one such treat, which is typically included with dispensing toys for domestic cats. The scent of catnip has been shown to attract and excite cats, and therefore is particularly well suited for use in conjunction with cat toys. However, in order for the catnip to be effective, its scent must be able to emanate from the toy. To this end, traditional catnip toys included porous cloth packets filled with catnip. While such cloth allowed the scent of catnip to diffuse through the cloth layer, the cloth structure was susceptible to tearing and breaking in response to the prolonged use of cat biting and scratching.

What is needed is a simple, economical, durable and disposable device with which an animal, such as a domestic animal, interacts that also dispenses material. What is also needed is a material dispensing device with which an animal interacts by playing with the device or by being trained using the device.

SUMMARY

The present invention is directed to an animal attractant dispensing device configured so that animal interaction causes deformation or deflection of the device which causes animal attractant within the device to be dispensed from the device rewarding an animal interacting with the device. In a preferred embodiment, the animal attractant dispensing device is a flexible deformation-induced dispensing pouch formed of a sidewall of flexible and perforate construction that dispenses animal attractant through perforations in the pouch sidewall when subjected to deformation or deflection from an animal interacting with the pouch.

An animal attractant dispensing pouch constructed in accordance with the present invention is of tubular construction and is at least partially filled with animal attractant of edible composition. The pouch can be formed with one or more end closures that close or otherwise seal one or both ends of the pouch to help keep animal attractant in the pouch when the pouch is not in use.

The pouch is formed of a segment of mesh tubing or sleeving of Chinese finger-cuff construction made of a biaxial woven or braided material defining a perforate, endless and flexible pouch sidewall. The pouch sidewall is formed of a plurality of pairs of first and second elongate helical or spiral strands that are biaxially woven or braided defining perforations therethrough whose size changes in response to animal-induced deflection or deformation of the pouch dispensing particles of animal attractant through perforations enlarged as a result. The pouch sidewall is made of a durable, tough and abrasion resistant plastic that preferably is nylon or polyethylene terephthalate enabling a pouch constructed in accordance with the present invention to withstand animal biting and scratching with animal claws.

Such a biaxial woven or braided pouch sidewall construction enables the pouch to diametrically expand or widen when axially compressed, such as by urging one end relative to the opposite end toward the opposite end, and diametrically contract or narrow when axially stretched, such as by pulling one end relative to the opposite end away from the opposite end. When at least part of the pouch is axially compressed, a corresponding local portion of its biaxial woven sidewall deforms in a manner that causes the size of perforations in the region of pouch compression to increase allowing particles of the animal attractant within the pouch to pass through the enlarged perforation perforations and be dispensed from the pouch. When at least part of the pouch is axially stretched, its biaxial woven sidewall narrows or diametrically shrinks causing the size of perforations in the corresponding region to decrease opposing dispensation of particles of animal attractant through the reduced sized perforations.

Likewise, when the pouch is bitten, bent, scratched, clawed, twisted or otherwise deformed or deflected by an animal interacting with the pouch, the pouch locally diametrically expands or widens in a manner that causes at least some perforations to enlarge enabling particles of animal attractant to be dispensed from the pouch. Such animal-induced deformation or deflection causes relative movement between biaxially woven or braided strands that form the pouch sidewall increasing the size of a least some perforations large enough to allow particles of animal attractant to pass through or be squeezed through. Animal-induced deformation or deflection also causes engagement to occur between animal attractant in the pouch and the pouch sidewall, squeezing at least some particles of the animal attractant through perforations in the sidewall. Such engagement caused by animal-induced deformation or deflection also grinds some of the animal attractant in the pouch abrading particles that are squeezed through or which can pass through perforations in the pouch sidewall. Grinding and/or abrasion of animal attractant in the pouch can also release liquid, such as in the form of oils from the animal attractant that can produce a scent also dispensed from the pouch during animal interaction.

A preferred animal attractant dispensing device constructed in accordance with the invention is a cat toy pouch at least partially filled with catnip that is engaged by the pouch sidewall during interaction by the cat causing at least some catnip to be dispensed through perforations in the pouch sidewall enticing the cat into continued interaction. During interaction, particles of catnip are dispensed from the pouch that are tasted or smelled by the cat exciting the cat into continued interaction that can be heightened as a result. During interaction, a scent can be dispensed from the pouch produced by grinding or abrasive engagement between the pouch sidewall and animal attractant in the pouch.

In a method of use, interaction with the pouch by a cat biting, grasping, rolling, twisting, bending or otherwise deforming or deflecting the pouch squeezes at least some particles of catnip out perforations in the pouch sidewall. Cat-induced deformation or deflection of the pouch enlarges at least some perforations in the pouch sidewall in a region of the pouch sidewall at or adjacent the deformation or deflection enabling smaller sized particles of catnip to pass through the perforations dispensing them from the pouch. Cat-induced deformation or deflection of the pouch grinds at least some of the catnip into smaller size catnip particles that more readily pass through perforations in the pouch sidewall and causes at least some catnip particles to be squeezed out perforations in the pouch sidewall. Cat-induced deformation or deflection of the pouch that not only grinds catnip particles into smaller size particles, but also releases oils onto particles being dispensed from the pouch increasing their pungency. Such released oils also produce a scent that is dispensed from perforations in the pouch sidewall into the air surrounding the cat. Dispensation of catnip particles provides a treat or reward to the cat interacting with the pouch advantageously enticing the cat into further interaction with the pouch.

These and various other features, aspects, and advantages of the present invention will be made apparent from the following descriptions of the drawings and detailed description.

DRAWING DESCRIPTION

The drawings illustrate at least one preferred embodiment presently contemplated for carrying out the invention. In the drawings:

FIG. 2 is a top plan view of the animal attractant dispensing device.

FIG. 3 is a side elevation view of the animal attractant dispensing device.

FIG. 4 is an end view of the animal attractant dispensing device.

FIG. 8 is an enlarged fragmentary view of a portion of the perforate sidewall defining a perforation formed therein whose size increases or decreases in response to deflection or deformation of the animal attractant dispensing device during animal interaction therewith.

FIG. 9 is an enlarged cross section of the animal attractant dispensing device filled with animal attractant.

Figure 1:
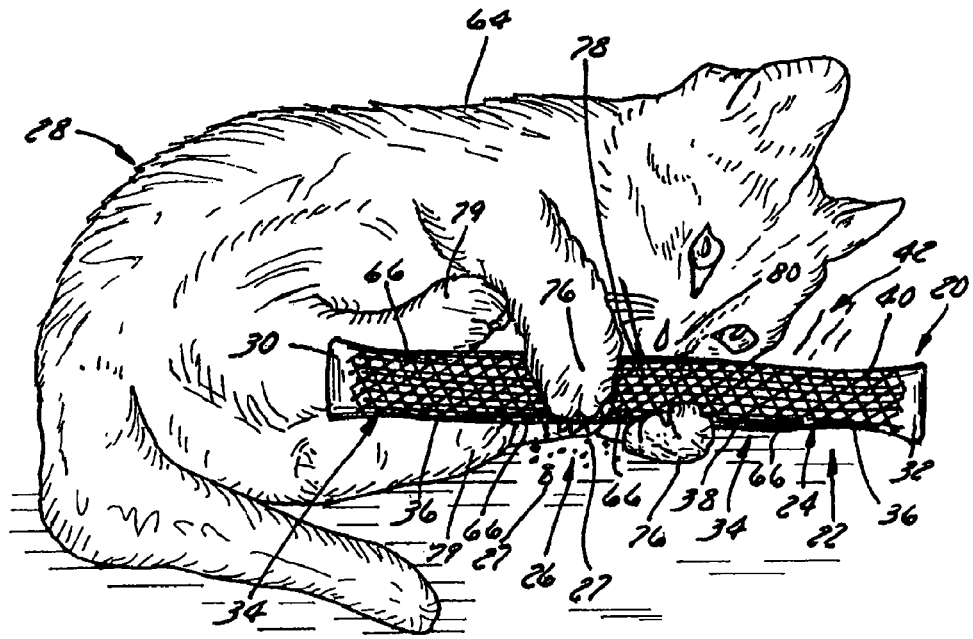
FIG. 1 is a perspective view of a cat interacting with a flexible perforate pouch of an animal attractant dispensing device constructed in accordance with the present invention containing animal attractant that dispenses when the pouch deflects during animal interaction with the pouch.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-9 illustrate an animal attractant dispensing device 20 that is a deformation-induced dispensing pouch 22 formed of a sidewall 24 of flexible and perforate construction that dispenses animal attractant 26 held by the pouch 22 when the pouch 22 is deformed or deflected during interaction with an animal 28, such as a cat 64. The flexible perforate pouch 22 is of tubular construction and is at least partially filled with animal attractant 26, such as a particulate or granular animal attractant 26 of edible or consumable composition like catnip (e.g., nepeta, such as nepeta cataria or the like). The pouch 22 can include or be formed with one or more closures 30 and 32 disposed at opposite ends to help hold animal attractant 26 within the pouch 22. During animal interaction with the pouch 22, a scent 42, such as from an oil, fragrance, perfume, or aromatic expressed by animal attractant 26 within the pouch 22 that is engaged by the pouch 22 during pouch deflection or deformation, can be released or dispensed.

The release or dispensation from the pouch 22 of animal attractant 26, including any scent 42 from the animal attractant 26, encourages desired behavior in the animal 28 interacting with the pouch 22. For example, in one preferred embodiment, the pouch 22 holds catnip animal attractant 26 that is dispensed during interaction with the pouch 22 by a cat 64 enticing the cat 64 into continued or heightened interaction, e.g., play, with the pouch 22. If desired, the animal attractant 26 can be selected to help train the behavior of an animal, such as a dog, interacting with another embodiment of the pouch 22 filled with another type of animal attractant, such as peanut butter, dog treats, etc.

The pouch 22 is formed of a segment 34 of mesh braided tubing or sleeving 36 of Chinese finger-cuff material 38 made of a biaxial woven material 40 defining a perforate, endless and flexible sidewall 24 of the pouch 22. Being of Chinese finger cuff material construction 38, the biaxially woven or braided sidewall 24 defines a plurality of pairs of perforations 66 formed therein that communicate with an internally disposed attractant holding compartment 44 (FIGS. 7 and 9) within the pouch 22 enabling particles 27, e.g., granules, of animal attractant 26 within the pouch 22 to pass through perforations 66 and be dispensed from the pouch 22 in response to deformation of the pouch 22.

For example, where the pouch 22 is filled with catnip animal attractant 26, particles 27 of catnip 26 pass through perforations 66 in the pouch sidewall 24 when a cat 64 interacts with the pouch 22 by playing with the pouch 22 in a manner that causes pouch deformation. The releasing or dispensation of particles 27 of catnip 26 from the pouch 22 during play with the pouch 22 that the cat 64 can taste and/or smell rewards the cat 64 enticing the cat 64 into continued or even heightened play with the pouch 22. The cat 64 can also be rewarded with a scent 42 released from the pouch 22 from oil, e.g., nepetalactone, in catnip 26 within the pouch 22 expressed from the catnip 26 during engagement between the catnip 26 and pouch 22 caused by cat-induced pouch deformation.

The sidewall 24 of the pouch 22 is formed of a biaxial woven or braided material of Chinese finger-cuff construction 38 having a first plurality of spaced apart and generally parallel elongate strands 46 that each extend along and/or generally parallel to a first strand axis 48 with each first strand 46 crisscrossing a second plurality of spaced apart and generally parallel elongate strands 50 that each extend along and/or generally parallel to a second strand axis 52. The pouch sidewall 24 is formed of a first plurality of pairs, i.e., at least three, of generally spiral or helically extending strands 46 that crisscross and are braided with a second plurality of pairs, i.e. at least three, of generally spiral or helically extending strands 50 in a manner that permits relative, e.g., sliding, movement between strands 46 and 50 in response to deflection of the pouch 22 by an animal interacting with the pouch 22, such as while playing with the pouch 22.

With reference to FIGS. 2 and 3, each first strand 46 (and corresponding first strand axis 48) is acutely angled relative to the second strand axis 52 (and second strands 50) and is also acutely angled relative to a generally longitudinally extending central axis 54 of the pouch 22. Likewise, each second strand 50 (and corresponding second strand axis 52) is acutely angled relative to the first strand axis 48 (and first strands 46) and is also acutely angled to the central pouch axis 54.

As is best shown in FIG. 3, each first strand 46 generally spirals or helically extends around the longitudinal central axis 54 of the pouch 22 with each first strand 46 oriented at a first acute included angle, e, relative to the central axis 54. Likewise, each second strand 50 generally spirals or helically extends around the longitudinal central axis 54 with each second strand 50 oriented at a second acute included angle, B, relative to the central axis 54. As is also shown in FIG. 3, each first strand 46 and first strand axis 48 is acutely angled relative to each second strand 50 and second strand axis 52 as the combined sum of the included angle, e, between first strand axis 48 and center pouch axis 54 and the included angle, B, between second strand axis 52 and center pouch axis 54 is less than 90 degrees.

With specific reference to FIGS. 2-7, first and second strands 46 and 50 are woven together so that each one of the first strands 46 alternately overlies and then underlies at least one of the second strands 50 and each one of the second strands 50 alternately overlies and then underlies at least one of the first strands 46 biaxially weaving or braiding the strands 46 and 50 together to form the perforate, flexible and endless sidewall 24 of the pouch 22. Each one of the first strands 46 can alternately overlie and then underlie a plurality of second strands 50 crisscrossing the second strands 50 and each one of the second strands 50 can alternately overlie and then underlie a plurality of first strands 46 also crisscrossing the first strands 46. For example, in one preferred embodiment, each one of the first strands 46 alternately overlies one pair of second strands 50 and then underlies another pair of second strands 50 and each one of the second strands 50 in turn alternately overlies one pair of first strands 46 before underlying a second pair of the first strands 46, such as in the manner shown in FIG. 5.

Figure 5:
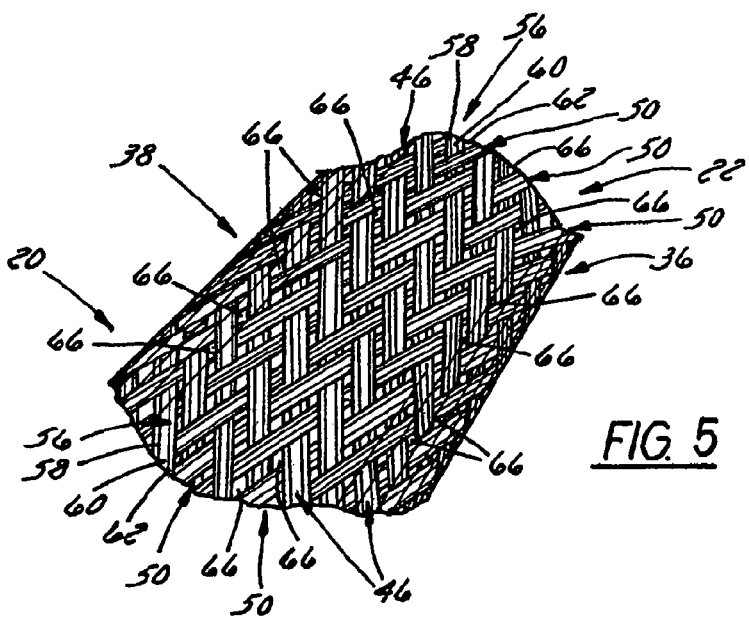
FIG. 5 is an enlarged fragmentary view of a portion of a perforate sidewall made of biaxial woven material that forms the animal attractant dispensing device.

With specific reference to FIG. 5, the flexible and perforate pouch sidewall 24 can be formed of first and second plurality of pairs of spiral or helically woven or braided strands 46 and 50 that are each formed by an elongate filament bundle 56 having a plurality of elongate filaments 58, 60 and 62 that can also each extend substantially the length of the pouch 22. As is depicted in FIG. 5, each filament bundle 56 can have three filaments 58, 60 and 62 arranged so they are generally parallel and adjoin one another along one or both longitudinally extending sides of the filament. Each filament bundle 56 can define a strand 46 and/or 50 having an oblong or generally rectangular transverse cross-section. In a preferred embodiment, the filaments 58, 60 and 62 of each strand 46 and/or 50 can function as a strand 46 and/or 50 of one piece, unitary and substantially homogeneous construction permitting relative movement of one strand e.g., one or more first strands 46, relative to another strand, e.g., one or more second strands 50, in response to deflection of a portion of the pouch 22. If desired, one or more of the filaments 58, 60 and 62 of a particular strand 46 and/or 50 can be movable, e.g., slidable, relative to one or more of the other filaments 58, 60 and/or 62 of the strand 46 and/or 50.

Each strand 46 and 50 extends substantially the entire length of the pouch 22 with the strands 46 and 50 converging together at or adjacent at least one end of the pouch 22 forming a closure, such as closure 30 and/or closure 32, that helps hold animal attractant 26 in the pouch. For example, in the pouch 22 shown in FIGS. 1-7, the spiral or helical woven or braided strands 46 and 50 that form the perforate pouch sidewall 24 converge together at opposite ends of the pouch 22 where respective closures 30 and 32 close the ends of the pouch 22.

In a preferred embodiment, the strands 46 and 50 of the pouch 22, including any filaments 58, 60 and/or 62 from which any strand 46 and/or 50 is formed, are made of a flexible material that preferably is plastic. One preferred plastic is nylon, as nylon provides a desired combination of durability, toughness and abrasion resistance to an animal 28 chewing on the pouch 22. Making the pouch 22 of plastic advantageously enables each closure 30 and 32 to be formed of a seal, such as a heat seal that can be formed by a hot knife, RF sealer, or the like. Such a plastic pouch construction also produces a pouch 22 of disposable construction that can be disposed of after the animal attractant 26 within the pouch 22 has been exhausted or used up.

In one preferred embodiment, the pouch 22 is formed of nylon expandable braided sleeving, such as an expandable braided sleeving or tubing made of nylon 6, 6. If desired, the pouch 22 can be made of another type of plastic, such as polyethylene terephthalate (PET) or the like, which provides a suitable combination of abrasion resistance, durability and toughness.

Figure 6:
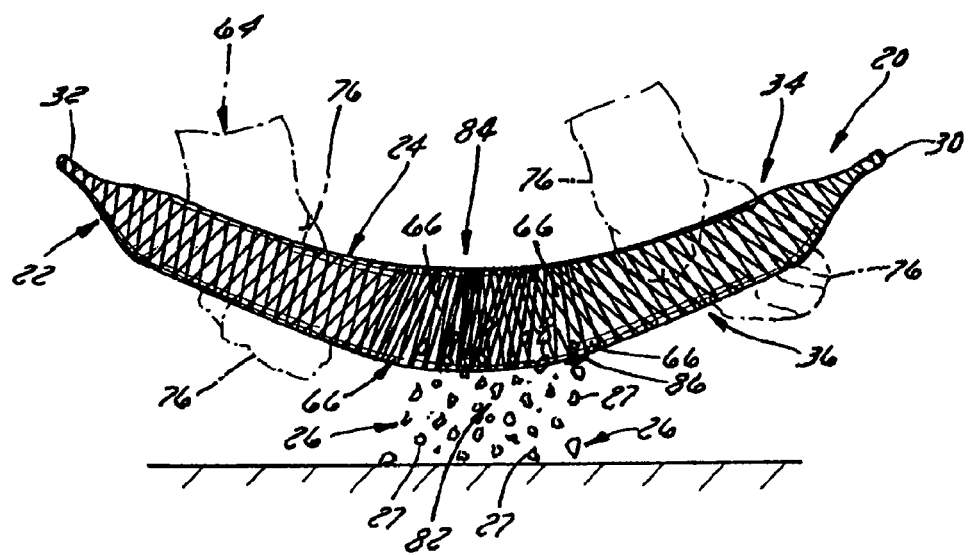
FIG. 6 is a side elevation view of the animal attractant dispensing device undergoing deflection causing animal attractant to be dispensed from the device.

Weaving or braiding the strands 46 and 50 into a perforate, flexible and endless sidewall 24 of the pouch 22 in such a manner permits the first and second strands 46 and 50 to move relative to one another, including by sliding over and/or along one another, when at least part of the pouch 22 is deflected or deformed, such as by being bent, twisted, compressed, bit, swatted, batted around, and/or pulled by the animal 28, such as a pet, like the cat 64 shown in FIGS. 1 and 6, during animal interaction with the pouch 22. Since the woven or braided strands 46 and 50 define a perforation 66 where each pair of adjacent and generally parallel first strands 46 crisscross each corresponding pair of adjacent and generally parallel second strands 50, the size of the perforations 66 in a particular region or regions of the pouch 22 can vary in response to relative movement between strands 46 and 50 caused by animal-induced deformation or deflection of the pouch 22 during animal interaction. Increasing the size of the perforations 66 in one or more regions of the pouch 22 due to animal-induced deformation or deflection will cause animal attractant 26 to be dispensed from the pouch 22 releasing particles of animal attractant 26 through perforations 66 enlarged during animal interaction.

Figure 7:
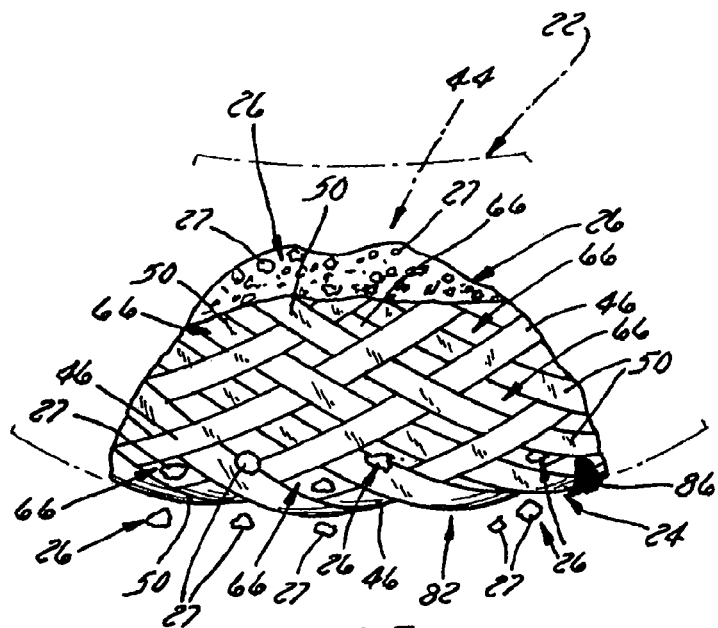
FIG. 7 is an enlarged fragmentary view of a portion of the perforate sidewall of the animal attractant dispensing device shown in FIG. 6 undergoing deflection.

At least a plurality of pairs of the perforations 66 is shaped generally like a parallelogram that can be rhomboid-shaped or a rhombus, e.g., diamond-shaped, like that depicted in FIGS. 5 and 7. In a preferred pouch embodiment, substantially all of the perforations 66 of the pouch 22 are parallelogram or rhomboid shaped. As is best shown in FIG. 8, each parallelogram-shaped perforation 66 is defined by two pairs of opposed sides 68, 70, 72 and 74 has a length, L, in a longitudinal direction relative to the pouch 22 and a width, W, in a transverse direction relative to the pouch 22 that increases or decreases in response to animal-induced deflection or deformation correspondingly increasing or decreasing perforation size. As is also shown in FIG. 8, one pair of opposed sides 68 and 70 of each perforation 66 is formed by a pair of adjacent but spaced apart generally parallel first strands 46 and the other pair of opposed perforation sides 72 and 74 is formed by a pair of adjacent but spaced apart generally parallel second strands 50.

In a method of use and operation, an animal 28, such as the cat 64 shown in FIGS. 1 and 6, interacts with the pouch 22 by engaging the pouch 22 in a manner that causes the pouch 22 to deform or deflect at least a portion of the pouch 22. For example, a cat 64 grasping the pouch 22 with its paws, e.g. front paws 76, can bite the pouch 22 with its mouth 78, such as is depicted in FIG. 1, or can bend the pouch 22, such as is depicted in FIG. 6 causing the pouch 22 to deform and/or deflect.

During deformation and/or deflection of the pouch 22 due to animal interaction, engagement between the pouch sidewall 24 and animal attractant 26 within the pouch 22 can grind the animal attractant 26. Grinding of the animal attractant 26 caused by animal interaction with the pouch 22 creates particles 27 that pass through perforations 66 in the pouch 22. Grinding of animal attractant 26 also can release oils from the attractant 26 which make particles 27 of attractant 26 passing through the perforations 66 in the pouch 22 more pungent. During deformation and/or deflection of the pouch 22, perforations 66 in one region 82 of the pouch 22 enlarge relative to perforations 66 in another region 84 of the pouch 22 becoming large enough so particles 27 of animal attractant 26 pass through the enlarged perforations 66, such as depicted in FIGS. 6 and 7.

Where grinding occurs during animal interaction, it results from engagement between the pouch 22 undergoing deformation or deflection and animal attractant 26 within the pouch 22 rubbing and/or abrading the animal attractant 26 into particles 27 capable of passing through perforations 66 in the sidewall 24 of the pouch 22. Where the animal attractant 26 is already formed of particulate matter, such as in the case where the animal attractant 26 is pre-ground catnip, engagement between the pouch 22 and the catnip animal attractant 26 grinds at least some particles of the catnip 26 into smaller particles 27, at least some of which pass through perforations 66 in the pouch sidewall 24 dispensing them to a cat 64 playing with the pouch 22 stimulating the cat 64.

Where the animal attractant 26 is or includes catnip, oil expressed from the catnip animal attractant 26 produced by grinding and/or squeezing of the catnip 26 in the pouch 22 can pass through perforations 66 in the pouch 22 into the surrounding air producing a scent 42 that can enter the mouth 78 or nose 80 of the cat 64 stimulating the cat 64. Such oil is also carried by particles 27 passing through perforations 66 in the pouch 22 causing the catnip particles 27 to be more pungent and more reactive to a cat 64 playing with the pouch 22. As is depicted by FIGS. 6 and 7, such oil 86 can also directly pass through or be squeezed out perforations 66 in the pouch 22 coating part of the exterior of the pouch sidewall 24 enabling the oil 86 to be licked by a cat 64 playing with the pouch 22.

Where the animal attractant 26 is something other than catnip, it can be of a composition from which a scent 42 can be expressed when the attractant 26 is engaged and squeezed and/or ground during pouch deformation or deflection that is then dispensed from the pouch 22. For example, the animal attractant 26 can be capsules that break during engagement with the pouch sidewall 24 during animal-induced deformation of the pouch 22 releasing a liquid or perfume that produces a scent 42 dispensed from the pouch 22 that can waft into the air surrounding the animal 28. Where liquid, e.g., oil, is released from particles 27 of animal attractant 26, the liquid 86 can coat the exterior of the pouch 22 enticing the animal 28 to lick the pouch 22.

With reference to FIG. 1, a cat 64 interacting with the pouch 22 grasps the pouch 22 between its front paws 76 and bites the pouch 22 with its mouth 78 causing particles 27 of catnip 26 to be squeezed out perforations 66 at and/or adjacent its mouth 78 stimulating the cat 64 into further interaction with the pouch 22. While the cat 64 is grasping the pouch 22 between its front paws 76, the cat 64 also kicks or scratches part of the pouch 22 with its rear paws 79 a distance from its front paws 78 causing particles 27 of catnip 26 to be squeezed out perforations 66 at or adjacent where the rear paws 79 are engaging the pouch.

As is also shown in FIG. 1, particles 27 of catnip 26 dispensed from the perforations 66 adjacent and along where the cat 64 engages the pouch 22 with its front paws 76 (as well as where the cat 64 engages the pouch 22 with its rear paws 79 and/or mouth 78) can waft into the air where it can be smelled by the nose 80 of the cat 64 further stimulating the cat 64. In addition, the cat 64 can grasp the pouch 22 between one or both pairs of paws 76 and/or 79 kicking or tossing the pouch 22 into the air chasing after the pouch 22 with such engagement causing release of additional particles 27 of catnip 26.

Interaction with the pouch 22 by a cat 64 can be in the form of bending or twisting of the pouch 22, such as is depicted in FIGS. 6 and 7. When twisted, such as relative to the longitudinal axis 54 (FIGS. 2 and 3), the perforations 66 in one region 82 of the pouch 22 will enlarge, such as depicted in FIG. 7, enabling particles 27 of catnip 26 to pass through the enlarged perforation 66.

Likewise, when bent in a manner that imparts a radius of curvature to the pouch 22, such as in the manner depicted in FIGS. 6 and 7, the perforations 66 extending generally along a region 82 of the pouch 22 where it is convexly curved become enlarged due to relative movement between strands 46 and 50 of the biaxially woven or braided pouch sidewall 24 enabling particles 27 of catnip 26 to pass through the enlarged perforation 66. For example, when the pouch 22 is engaged by a cat 64 in a manner that bends the pouch 22, such as by bending the pouch 22 upwardly in the manner shown in FIG. 6, the perforations 66 on at least one side along the radius of curvature of the pouch 22 are enlarged relative to the perforations 66 on the opposite side along the radius of curvature as a result of relative movement between strands 46 and 50 that form the biaxially woven or braided pouch sidewall 24.

When the pouch 22 is being bent, twisted, bitten, scratched, compressed, and/or stretch during animal interaction, relative movement of strands 46 and/or 50 of the biaxially woven or braided pouch sidewall 24 cause particles 27 of the catnip 26 within the pouch 22 to be ground into smaller or finer particles 27 by engagement with the pouch sidewall 24, at least some of which are small enough to be squeezed through perforations 66 in the pouch sidewall 24. While this is occurring, deformation of the pouch sidewall 24 also causes perforations 66 in one region 82 of the pouch 22 to enlarge allowing particles 27 of catnip 26 small enough to pass through the enlarged perforations 66 to do so.

The present invention is directed to an animal attractant dispensing device that can be an animal toy comprised of a flexible bi-axially woven or braided material of perforated construction that disperses and dispenses an animal attractant in response to interaction with the device by the animal. The present invention can be further directed to an animal attractant dispensing device formed of a perforate flexible tube where the tube is includes a plurality elongate helical or spiral strands woven or braided into a pouch sidewall having perforations through which the animal attractant is dispersed when the pouch is being manipulated by a pet interacting with the pouch such as by playing with the pouch. The present invention can be further directed to a perforate animal attractant dispensing pouch having a first plurality of helical or spiral longitudinally extending elongate strands that are acutely angled at one angle relative to a longitudinal axis of the pouch and a second plurality of helical or spiral longitudinally extending elongate strands that are acutely angled at another angle relative to the longitudinal axis of the pouch crossing the first plurality of helical or spiral longitudinally extending elongate strands at an angle defining opposed acute included angles extending longitudinally and opposed obtuse included angles extending transversely. The present invention can be further defined where the woven or braided strands are movable relative to one another changing the size of a plurality of perforations defined by the woven or braided strands enabling granular or particulate animal attractant to pass through the perforations during physical interaction with the pouch by an animal. The present invention can be further defined where the perforations defined by a first plurality of strands and a second plurality of strands form parallelogram shaped perforations whose size changes depending on stress or strain from deflection or deformation to the pouch applied by the animal to the pouch during animal interaction with the pouch. The present invention can be further defined with the animal attractant being catnip that is crushed or ground catnip. The present invention can be further defined where the ground or crushed catnip is ground or crushed into smaller sized particles or grains of catnip during physical engagement and manipulation of the pouch by a cat playing with the pouch.

Understandably, the present invention has been described above in terms of the preferred embodiment. It is recognized that various alternatives and modifications may be made to these embodiments which are within the scope of the appended claims.

What is claimed is:

1. An animal attractant dispensing device comprising:
   a flexible pouch having a plurality of pairs of perforations through which an animal attractant inside the pouch is dispensed by deformation of the pouch caused by interaction with the pouch by an animal, the pouch made of a flexible perforate sidewall formed of a section of braided or woven tubing or sleeving comprised of a plurality of elongate strands forming perforations therebetween, the strands helically spiraling about a central longitudinal axis of the pouch and movable relative to one another in response to deformation or deflection of the pouch by animal interaction changing the size of a plurality of the perforations formed in the pouch sidewall; and
   an animal attractant disposed inside the pouch.

2. The animal attractant dispensing device of claim 1 wherein deformation of the pouch comprises at least one of squeezing, bending, compressing and rolling of the pouch causing a size of a plurality of the perforations in the pouch to increase, and wherein engagement between animal attractant within the pouch and the pouch during deformation causes animal attractant to pass through the enlarged perforations.

3. The animal attractant dispensing device of claim 2 wherein the flexible perforate sidewall of the pouch is of endless construction.

4. The animal attractant dispensing device of claim 3 wherein the flexible perforate sidewall of the pouch is comprised of a biaxial woven or biaxial braided material.

5. The animal attractant dispensing device of claim 2 wherein the flexible perforate sidewall of the pouch is comprised of plastic.

6. The animal attractant dispensing device of claim 1 wherein the flexible perforate sidewall of the pouch is of endless construction and engages animal attractant within the pouch during animal interaction grinding or abrading animal attractant into particles small enough to pass through perforations in the pouch.

7. The animal attractant dispensing device of claim 1 wherein the flexible perforate sidewall of the pouch is of endless construction that engages animal attractant within the pouch during animal interaction grinding or abrading animal attractant expressing oil therefrom producing a scent dispensed from the pouch.

8. An animal attractant dispensing device comprising:
   a flexible pouch having a plurality of pairs of perforations through which an animal attractant inside the pouch is dispensed by deformation of the pouch caused by interaction with the pouch by an animal, the pouch made of a flexible perforate sidewall formed of a section of braided or woven tubing or sleeving, the pouch sidewall formed of a first plurality of strands oriented at an acute angle relative to a central longitudinal axis of the pouch, and the pouch sidewall formed of a second plurality of strands oriented at an acute angle relative to the central longitudinal axis of the pouch wherein the first and second plurality of strands crisscross one another, the strands movable relative to one another in response to deformation or deflection of the pouch by animal interaction changing the size of a plurality of the perforations formed in the pouch sidewall; and
   an animal attractant disposed inside the pouch.

9. The animal attractant dispensing device of claim 8 wherein the first plurality of strands form a first acute included angle, $\theta$, with the central longitudinal axis of the pouch to one side of the central longitudinal axis of the pouch, and wherein the second plurality of strands form a second acute included angle, $\beta$, with the central longitudinal axis of the pouch to an opposite side of the central longitudinal axis of the pouch.

10. The animal attractant dispensing device of claim 8 wherein each one of the strands is elongate and helically spirals about the central longitudinal axis of the pouch.

11. The animal attractant dispensing device of claim 8 wherein the pouch is closed at or adjacent one end.

12. The animal attractant dispensing device of claim 8 wherein the animal attractant is engaged by the pouch during deformation from interaction with the pouch by the animal dispensing a scent from the pouch.

13. The animal attractant dispensing device of claim 12 wherein the animal attractant is comprised of catnip and the scent dispensed from the pouch comprises oil released from catnip in the pouch engaged by the pouch during deformation from interaction with the pouch by the animal.

14. The animal attractant dispensing device of claim 8 wherein the animal attractant is engaged by the pouch during deformation from interaction with the pouch by the animal, grinding or abrading the animal attractant into smaller particles small enough to pass through perforations in the pouch in dispensing particles of animal attractant from the pouch.

15. The animal attractant dispensing device of claim 8 wherein the size of the plurality of perforations formed in the flexible perforate sidewall of the pouch increases in response to animal-induced deformation of the pouch during animal interaction with the pouch dispensing particles of animal attractant through the enlarged perforations.

16. The animal attractant dispensing device of claim 15 wherein the animal attractant is comprised of particulate or granular matter.

17. The animal attractant dispensing device of claim 16 wherein the animal attractant comprises catnip.

18. The animal attractant dispensing device of claim 17 wherein the pouch is closed at or adjacent opposite ends.

19. The animal attractant dispensing device of claim 18 wherein the pouch is closed at or adjacent opposite ends by a seal.

20. The animal attractant dispensing device of claim 19 wherein the seal at or adjacent opposite ends of the pouch comprises a heat seal.

21. An animal attractant dispensing device comprising:
a flexible elongate tubular pouch comprised of a flexible perforate sidewall formed of a biaxial woven or a biaxial braided tubing or sleeving comprised of a plurality of elongate strands helically spiraling about a central longitudinal axis of the pouch with a first plurality of the strands forming an acute included angle with the central longitudinal axis of the pouch to one side of the central longitudinal axis of the pouch and a second plurality of the strands forming an acute included angle with the central longitudinal axis of the pouch to an opposite side of the central longitudinal axis of the pouch, the strands defining a plurality of pairs of rhombus-shaped perforations formed in the pouch sidewall through which an animal attractant inside the pouch is dispensed from the pouch by deformation of the pouch during interaction with the pouch by an animal, the strands movable relative to one another during deformation of the pouch increasing the size of a plurality of the perforations formed in the pouch sidewall dispensing animal attractant therethrough; and
an animal attractant received in the flexible pouch.

22. The animal attractant dispensing device of claim 21 wherein each strand is comprised of a filament bundle formed of a plurality of elongate filaments.

23. The animal attractant dispensing device of claim 21 wherein the animal attractant is comprised of particulate or granular matter.

24. The animal attractant dispensing device of claim 23 wherein the animal attractant comprises catnip.

\* \* \* \* \*